United States Patent
Lei et al.

(10) Patent No.: US 11,665,102 B2
(45) Date of Patent: *May 30, 2023

(54) CONTENTION WINDOW SIZE ADJUSTMENT IN A WIRELESS COMMUNICATION SYSTEM

(71) Applicant: Lenovo Innovations Limited (Hong Kong), Hong Kong (CN)

(72) Inventors: Haipeng Lei, Beijing (CN); Zukang Shen, Beijing (CN); Xiaodong Yu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,405

(22) Filed: Sep. 10, 2021

(65) Prior Publication Data

US 2021/0409338 A1 Dec. 30, 2021

Related U.S. Application Data

(63) Continuation of application No. 16/597,708, filed on Oct. 9, 2019, now Pat. No. 11,121,977, which is a
(Continued)

(51) Int. Cl.
*H04L 47/27* (2022.01)
*H04W 40/16* (2009.01)
(Continued)

(52) U.S. Cl.
CPC ............ *H04L 47/27* (2013.01); *H04L 1/00* (2013.01); *H04L 1/1812* (2013.01); *H04L 5/006* (2013.01);
(Continued)

(58) Field of Classification Search
CPC ......... H04L 47/27; H04L 1/00; H04L 1/1812; H04L 5/0055; H04L 5/0057; H04L 5/006; H04L 5/0078; H04W 40/16
See application file for complete search history.

(56) References Cited

U.S. PATENT DOCUMENTS 7,826,838 B1 * 11/2010 Nanda ............... H04W 74/0841
709/224
8,155,102 B1 * 4/2012 Hakola ............. H04W 74/0866
370/345
(Continued)

FOREIGN PATENT DOCUMENTS

CN 102377513 A 3/2012
CN 103918315 A 7/2014
(Continued)

OTHER PUBLICATIONS

ZTE, "Contention window size adaptation for DL LBT in LAA", 3GPP TSG RAN WG1 Meeting #82 R1-154768, Aug. 24-28, 2015, pp. 1-6.
(Continued)

*Primary Examiner* — Michael J Moore, Jr.
(74) *Attorney, Agent, or Firm* — Kunzler Bean & Adamson

(57) ABSTRACT

Apparatuses, methods, and systems are disclosed for contention window size adjustment. One apparatus includes a transmitter that transmits data on a carrier to a set of devices in a first transmission burst having a duration of at least one subframe. In some embodiments, the set of devices includes one or more devices. In various embodiments, the apparatus includes a receiver that receives feedback information from each device. In certain embodiments, the apparatus includes a processor that determines, based on the feedback information, whether interference above a predetermined level exists on the carrier during the first transmission burst at
(Continued)

each device, adjusts a contention window size based on the determination of whether interference above the predetermined level exists on the carrier during the first transmission burst at each device, and determines a value N between a predetermined minimum contention window size and the adjusted contention window size.

20 Claims, 7 Drawing Sheets

Related U.S. Application Data continuation of application No. 15/759,785, filed as application No. PCT/CN2015/089542 on Sep. 14, 2015, now Pat. No. 10,554,566.

(51) Int. Cl.
  *H04L 1/00* (2006.01)
  *H04L 1/1812* (2023.01)
  *H04L 5/00* (2006.01)

(52) U.S. Cl.
  CPC .......... *H04L 5/0055* (2013.01); *H04L 5/0057* (2013.01); *H04L 5/0078* (2013.01); *H04W 40/16* (2013.01)

(56) References Cited

U.S. PATENT DOCUMENTS

| | | | |
|---|---|---|---|
| 10,201,014 B2* | 2/2019 | Kadous | H04W 72/0446 |
| 10,291,379 B2* | 5/2019 | Kadous | H04L 1/1887 |
| 10,292,158 B2* | 5/2019 | Yerramalli | H04L 1/1822 |
| 10,554,566 B2* | 2/2020 | Lei | H04W 40/16 |
| 10,686,551 B2 | 6/2020 | Deng et al. | |
| 11,121,977 B2* | 9/2021 | Lei | H04W 40/16 |
| 2007/0190945 A1 | 8/2007 | Lee et al. | |
| 2008/0090575 A1 | 4/2008 | Barak et al. | |
| 2009/0005092 A1* | 1/2009 | Li | H04W 28/18 |
| | | | 455/501 |
| 2009/0264088 A1 | 10/2009 | Li et al. | |
| 2011/0019721 A1 | 1/2011 | Diener et al. | |
| 2012/0164948 A1 | 6/2012 | Narasimha et al. | |
| 2012/0300712 A1* | 11/2012 | Hakola | H04W 74/008 |
| | | | 370/329 |
| 2013/0136013 A1 | 5/2013 | Kneckt et al. | |
| 2013/0208587 A1 | 8/2013 | Bala et al. | |
| 2015/0331771 A1 | 11/2015 | Conway | |
| 2016/0088618 A1* | 3/2016 | Barriac | H04W 74/0816 |
| | | | 370/329 |
| 2016/0278088 A1* | 9/2016 | Cheng | H04W 16/14 |
| 2016/0338054 A1* | 11/2016 | Oh | H04W 74/0841 |
| 2016/0345326 A1* | 11/2016 | Yerramalli | H04W 72/0413 |
| 2017/0019909 A1* | 1/2017 | Si | H04W 76/28 |
| 2017/0034831 A1* | 2/2017 | Yerramalli | H04W 72/08 |
| 2017/0041957 A1* | 2/2017 | Pazhyannur | H04L 1/203 |
| 2017/0048861 A1* | 2/2017 | Choi | H04L 5/0053 |
| 2017/0055296 A1* | 2/2017 | Cheng | H04L 1/1893 |
| 2017/0079013 A1* | 3/2017 | Noh | H04L 1/187 |
| 2017/0156161 A1* | 6/2017 | Kang | H04W 74/0816 |
| 2017/0171897 A1* | 6/2017 | Ryu | H04W 4/70 |
| 2017/0237527 A1* | 8/2017 | Lei | H04L 1/1864 |
| | | | 370/445 |
| 2017/0289972 A1* | 10/2017 | Lei | H04L 5/0053 |
| 2018/0020485 A1* | 1/2018 | Yang | H04W 74/008 |
| 2018/0115981 A1* | 4/2018 | Kim | H04W 74/0808 |
| 2018/0124828 A1* | 5/2018 | Kim | H04W 74/08 |
| 2018/0139779 A1* | 5/2018 | Kim | H04L 1/18 |
| 2018/0152267 A1* | 5/2018 | Andreoli-Fang | H04L 1/08 |
| 2018/0175975 A1* | 6/2018 | Um | H04W 16/14 |
| 2018/0199376 A1* | 7/2018 | Kim | H04W 74/0816 |
| 2018/0288790 A1* | 10/2018 | Kim | H04W 72/1278 |
| 2018/0343205 A1* | 11/2018 | Lei | H04L 1/1812 |
| 2021/0409338 A1* | 12/2021 | Lei | H04L 1/00 |

FOREIGN PATENT DOCUMENTS

| | | | |
|---|---|---|---|
| EP | 1760925 A2 | 3/2007 | |
| WO | WO-2017045105 A1 * | 3/2017 | ............... H04L 1/00 |

OTHER PUBLICATIONS

KDDI, "Category 4 LBT for LAA Downlink", 3GPP TSG RA WG1 Meeting #82 R1-154375, Aug. 24-28, 2015, pp. 1-6.

Intel Corporation, "On the contention window adaptation for DL only", 3GPP TSG RAN WG1 Meeting #82 R1-154081, Aug. 24-28, 2015, pp. 1-4.

Huawei, Hisilicon, "Triggering mechanism for contention window size adaptation", 3GPP TSG RA WG1 Meeting #82 R1-153782, Aug. 24-28, 2015, pp. 1-4.

Samsung, "Details of DL Cat 4 LBT procedure", 3GPP TSG RAN WG1 Meeting #82 R1-154765, Aug. 24-28, 2015, pp. 1-7.

* cited by examiner

CONTENTION WINDOW SIZE ADJUSTMENT IN A WIRELESS COMMUNICATION SYSTEM

CROSS REFERENCE TO RELATED APPLICATIONS

This application is a continuation of application Ser. No. 16/597,708 filed on Oct. 9, 2019, which is a continuation of application Ser. No. 15/759,785 filed on Mar. 13, 2018, all of which are hereby incorporated by reference in their entirety.

FIELD

The subject matter disclosed herein relates generally to wireless communications and more particularly relates to contention window size adjustment in a wireless communication system.

BACKGROUND

The following abbreviations are herewith defined, at least some of which are referred to within the following description.
3GPP Third Generation Partnership Project
ACK Positive-Acknowledgment
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CSS Common Search Space
CWS Contention Window Size
DCI Downlink Control Information
DL Downlink
eCCA Enhanced Clear Channel Assessment
eNB Evolved Node B
EPDCCH Enhanced Physical Downlink Control Channel
ETSI European Telecommunications Standards Institute
FBE Frame Based Equipment
FDD Frequency Division Duplex
FDMA Frequency Division Multiple Access
FEC Forward Error Correction
HARQ Hybrid Automatic Repeat Request
LAA Licensed Assisted Access
LBE Load Based Equipment
LBT Listen-Before-Talk
LTE Long Term Evolution
MCL Minimum Coupling Loss
MCS Modulation and Coding Scheme
MU-MIMO Multi-User, Multiple-Input, Multiple-Output
NACK or NAK Negative-Acknowledgment
OFDM Orthogonal Frequency Division Multiplexing
PCell Primary Cell
PBCH Physical Broadcast Channel
PDCCH Physical Downlink Control Channel
PDSCH Physical Downlink Shared Channel
PHICH Physical Hybrid ARQ Indicator Channel
PRACH Physical Random Access Channel
PRB Physical Resource Block
PUCCH Physical Uplink Control Channel
PUSCH Physical Uplink Shared Channel
QoS Quality of Service
QPSK Quadrature Phase Shift Keying
RAR Random Access Response
RRC Radio Resource Control
RX Receive
SC-FDMA Single Carrier Frequency Division Multiple Access
SCell Secondary Cell
SCH Shared Channel
SIB System Information Block
SINR Signal-to-Interference-Plus-Noise Ratio
SR Scheduling Request
TBS Transport Block Size
TDD Time-Division Duplex
TDM Time Division Multiplex
TX Transmit
UCI Uplink Control Information
UE User Entity/Equipment (Mobile Terminal)
UL Uplink
UMTS Universal Mobile Telecommunications System
WiMAX Worldwide Interoperability for Microwave Access In wireless communications networks, LAA facilitates an LTE system to use an unlicensed spectrum with assistance from licensed carrier. LAA further aims to facilitate the fair coexistence with other technologies over the unlicensed spectrum and to satisfy various regulatory requirements in different countries and regions. As stated in LAA SI, TR36.889, an LBT procedure may facilitate fair and friendly coexistence of LAA with other operators and technologies operating in the unlicensed spectrum. In TR36.889, various LBT schemes are defined, including a category 4 relating to LBT with random back-off with a contention window of variable size. Specifically, TR36.889 states for category 4 that "[t]he LBT procedure has the following as one of its components. The transmitting entity draws a random number N within a contention window. The size of contention window is specified by the minimum and maximum value of N. The transmitting entity can vary the size of the contention window before drawing the random number N. The random number N is used in the LBT procedure to determine the duration of time that the channel is sensed to be idle before the transmitting entity transmits on the channel."

In certain configurations, a contention window size ("CWS") may be updated after the completion of each downlink transmission burst. In other configurations, the CWS for LBT category 4 channel access scheme in an unlicensed carrier may only be increased in situations with high load in order to avoid the channel collision or decreased in situations with low load in order to improve spectrum efficiency. For each adaptive adjustment, LAA base units (e.g., eNBs) may facilitate various equipment having a fair share of unlicensed spectrum access opportunities (e.g., for itself and for all the scheduled remote units (e.g., UEs)). In the meantime, base units may also aim to adjust the CWS to increase the overall unlicensed spectrum utilization efficiency and reduce the probability of transmission collision.

There are various different interference situations involving base units and remote units. In some situations, a base unit may encounter a problem with hidden nodes. One example is shown in a wireless communication system 700 illustrated in FIG. 7. The wireless communication system 700 includes a base unit 702 (e.g., an LAA eNB) having a CCA range 704 and a cell coverage area 706. The base unit 702 transmits downlink data to its served remote unit 708 (e.g., UE1). Another node, which in this example is a Wi-Fi AP 710, is located nearby to the remote unit 708, but the Wi-Fi AP 710 transmissions cannot be sensed by the base unit 702. In this case, for DL PDSCH transmission to the remote unit 708, the CWS may benefit from being increased to avoid possible collision with Wi-Fi transmission. However, given that the base unit 702 is unable to detect the presence of the Wi-Fi AP 710 based on the CCA energy detection or preamble detection due to coupling loss between the base unit 702 and the Wi-Fi AP 710, the base unit 702 may actually decrease its CWS for fast channel access assuming. Consequently, transmission collision between the base unit 702 and the Wi-Fi AP 710 may occur.

In another configuration, the CWS may be adjusted based on HARQ-ACK feedback. A similar mechanism is used in Wi-Fi: if ACK is not received after a frame from a station, a Wi-Fi AP determines that a collision happened and therefore doubles the CWS; otherwise, Wi-Fi AP resets the CWS to the minimum value. It is noted that in Wi-Fi, a transmission burst is only for a single remote unit or station. On the other hand, for LAA, it is possible that a transmission burst may include data transmitted to more than one remote unit. Therefore, this ACK/NACK based triggering mechanism has some drawbacks for LAA, especially in the case that a base unit schedules multiple remote units in one DL transmission burst or even schedules multiple remote units in one single subframe. ACK/NACK corresponding to each remote unit's DL data in each DL subframe will be reported to the base unit. Therefore, adapting the CWS based on the HARQ-ACK from all scheduled remote units collectively may not reflect the remote unit-specific interference situations present to properly adjust the CWS. One example is shown in a wireless communication system 800 illustrated in FIG. 8. The wireless communication system 800 includes a base unit 802 (e.g., an LAA eNB) having a CCA range 804 and a cell coverage area 806. The base unit 802 transmits downlink data to its served remote units 808 (e.g., UE1) and 810 (e.g., UE2). Another node, which in this example is a Wi-Fi AP 812, is located nearby to the remote unit 808, but the Wi-Fi AP 812 transmissions cannot be sensed by the base unit 802 or the remote unit 810. The remote unit 808 suffers the interference from the hidden node of Wi-Fi AP 812, while remote unit 810 has no hidden node problem. Therefore, serving remote units 808 and 810 may use different CWS for optimal performance.

BRIEF SUMMARY

Apparatuses for contention window size adjustment are disclosed. Methods and systems also perform the functions of the apparatus. In one embodiment, the apparatus includes a transmitter that transmits data on a carrier to a set of devices in a first transmission burst having a duration of at least one subframe. In some embodiments, the set of devices includes one or more devices. In various embodiments, the apparatus includes a receiver that receives feedback information from each device of the set of devices. In certain embodiments, the apparatus includes a processor that determines, based on the feedback information, whether interference above a predetermined level exists on the carrier during the first transmission burst at each device of the set of devices, adjusts a contention window size based on the determination of whether interference above the predetermined level exists on the carrier during the first transmission burst at each device of the set of devices, and determines a value N between a predetermined minimum contention window size and the adjusted contention window size.

In one embodiment, the transmitter transmits a second transmission burst on the carrier at least N time slots after the end of the first transmission burst, wherein the duration of each time slot is predetermined. In a further embodiment, the feedback information from each device of the set of devices includes hybrid automatic repeat request acknowledgement ("HARQ-ACK") feedback corresponding to the data transmitted in the first transmission burst to the device. In some embodiments, the processor determines, based on the feedback information, that interference above the predetermined level exists on the carrier during the first transmission burst for a device of the set of devices if a percentage of negative-acknowledgments ("NAKs") in the HARQ-ACK feedback from the device is greater than a predetermined threshold percentage. In certain embodiments, the processor determines, based on the feedback information, that interference above the predetermined level exists on the carrier during the first transmission burst for a device of the set of devices if more than a predetermined number of consecutive NAKs exist in the HARQ-ACK feedback from the device.

In another embodiment, the feedback information from each device of the set of devices includes channel quality information ("CQI") feedback from the device corresponding to the CQI of the device in the first transmission burst. In various embodiments, the processor determines, based on the feedback information, that interference above the predetermined level exists on the carrier during the first transmission burst for a device of the set of devices if the CQI feedback from the device is less than a latest CQI feedback from the device before the first transmission burst by a predetermined amount.

In some embodiments, adjusting the contention window size includes increasing the contention window size if interference above the predetermined level exists on the carrier during the first transmission burst for more than a predetermined percentage of devices in the set of devices. In various embodiments, adjusting the contention window size includes decreasing the contention window size if interference above the predetermined level exists on the carrier during the first transmission burst for less than a predetermined percentage of devices in the set of devices. In one embodiment, adjusting the contention window size includes increasing the contention window size if data is to be transmitted in the second transmission burst to at least one device having interference above the predetermined level on the carrier during the first transmission burst. In certain embodiments, adjusting the contention window size includes decreasing the contention window size if data is not to be transmitted in the second transmission burst to any device having interference above the predetermined level on the carrier during the first transmission burst.

A method for contention window size adjustment, in one embodiment, includes transmitting data on a carrier to a set of devices in a first transmission burst having a duration of at least one subframe. In such an embodiment, the set of devices may include one or more devices. In various embodiments, the method may include receiving feedback information from each device of the set of devices. In some embodiments, the method includes determining, based on the feedback information, whether interference above a predetermined level exists on the carrier during the first transmission burst at each device of the set of devices. In a further embodiment, the method includes adjusting a contention window size based on the determination of whether interference above the predetermined level exists on the carrier during the first transmission burst at each device of the set of devices. In various embodiments, the method includes determining a value N between a predetermined minimum contention window size and the adjusted contention window size.

In certain embodiments, the method includes transmitting a second transmission burst on the carrier at least N time slots after the end of the first transmission burst, wherein the duration of each time slot is predetermined. In one embodiment, the feedback information from each device of the set of devices includes hybrid automatic repeat request acknowledgement ("HARQ-ACK") feedback corresponding to the data transmitted in the first transmission burst to the device. In certain embodiments, determining, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if a percentage of negative-acknowledgments ("NAKs") in the HARQ-ACK feedback from the device is greater than a predetermined threshold percentage.

In some embodiments, determining, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if more than a predetermined number of consecutive NAKs exist in the HARQ-ACK feedback from the device. In one embodiment, the feedback information from each device of the set of devices includes channel quality information ("CQI") feedback from the device corresponding to the CQI of the device in the first transmission burst.

In one embodiment, determining, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if the CQI feedback from the device is less than a latest CQI feedback from the device before the first transmission burst by a predetermined amount.

In certain embodiments, adjusting the contention window size includes increasing the contention window size if interference above the predetermined level exists on the carrier during the first transmission burst for more than a predetermined percentage of devices in the set of devices. In various embodiments, adjusting the contention window size includes decreasing the contention window size if interference above the predetermined level exists on the carrier during the first transmission burst for less than a predetermined percentage of devices in the set of devices.

In various embodiments, adjusting the contention window size includes increasing the contention window size if data is to be transmitted in the second transmission burst to at least one device having interference above the predetermined level on the carrier during the first transmission burst. In one embodiment, adjusting the contention window size includes decreasing the contention window size if data is not to be transmitted in the second transmission burst to any device having interference above the predetermined level on the carrier during the first transmission burst.

In one embodiment, an apparatus includes a receiver that receives data on a carrier in a transmission burst with a duration of at least one subframe. In various embodiments, the apparatus may include a processor that determines an indication of whether interference above a predetermined level exists on the carrier during the transmission burst by comparing a received signal-to-interference-plus-noise ratio ("SINR") in a subframe in the transmission burst with a SINR that achieves a predetermined target block error ratio ("BLER") for an indicated modulation and coding scheme for the data transmitted in the subframe. The apparatus may also include a transmitter that transmits the indication to a device.

Another method for contention window size adjustment, in one embodiment, includes receiving data on a carrier in a transmission burst with a duration of at least one subframe. In various embodiments, the method includes determining an indication of whether interference above a predetermined level exists on the carrier during the transmission burst by comparing a received signal-to-interference-plus-noise ratio ("SINR") in a subframe in the transmission burst with a SINR that achieves a predetermined target block error ratio ("BLER") for an indicated modulation and coding scheme for the data transmitted in the subframe. In some embodiments, the method includes transmitting the indication to a device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
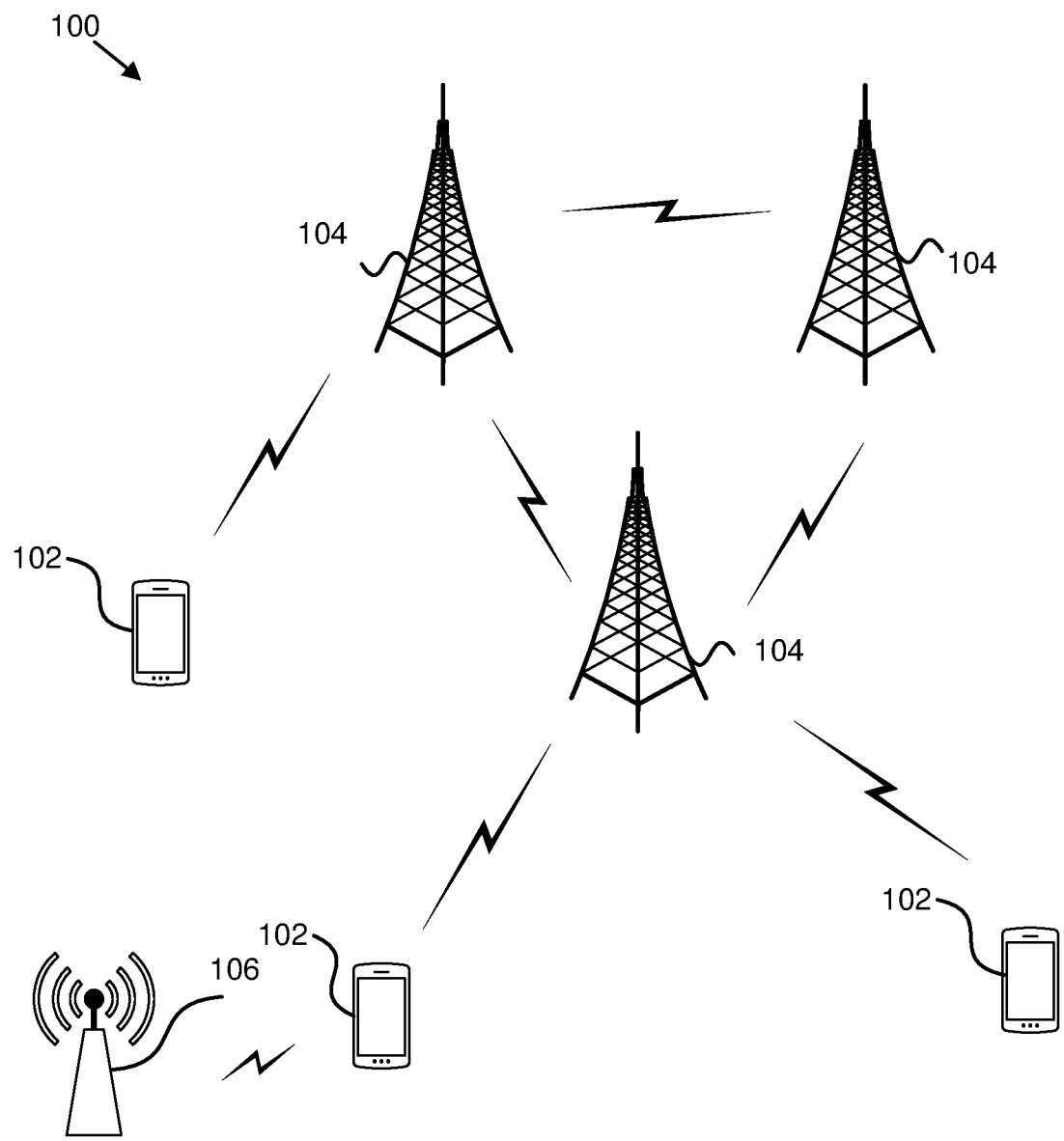
FIG. 1 is a schematic block diagram illustrating one embodiment of a wireless communication system for contention window size adjustment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for contention window size adjustment. In one embodiment, the wireless communication system 100 includes remote units 102, base units 104, and unlicensed carriers 106. Even though a specific number of remote units 102, base units 104, and unlicensed carriers 106 are depicted in FIG. 1, one of skill in the art will recognize that any number of remote units 102, base units 104, and unlicensed carriers 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. The unlicensed carriers 106 may be any suitable unlicensed carrier, such as a Wi-Fi access point ("AP"). The unlicensed carriers 106 may communicate with one or more of the remote units 102.

In one embodiment, a base unit 104 (e.g., device) may transmit data on a carrier to remote units 102 (e.g., set of devices) in a first transmission burst having a duration of at least one subframe. In such an embodiment, the remote units 102 may include one or more remote units 102. The remote unit 102 may receive the data on the carrier. Moreover, the remote unit 102 may determine an indication of whether interference above a certain level exists on the carrier during the transmission burst by comparing a received signal-to-interference-plus-noise ratio ("SINR") in a subframe in the transmission burst with a SINR that achieves a predetermined target block error ratio ("BLER") for an indicated modulation and coding scheme for the data transmitted in the subframe. Accordingly, the indication may include information that can be used to determine whether the interference above a predetermined level exists on the carrier (e.g., unlicensed carrier 106). Such interference may come from a hidden node or other devices operating on the same unlicensed carrier, but the interference is not known to the base unit 104. The remote unit 102 may transmit the indication (e.g., feedback information) to the base unit 104. The base unit 104 may receive the feedback information from one or more remote units 102. Moreover, the base unit 104 may determine, based on the feedback information, whether interference above a predetermined level exists on the carrier during the first transmission burst at each device of the set of devices. The base unit 104 may also adjust a contention window size based on the determination of whether interference above the predetermined level exists on the carrier during the first transmission burst at each device of the set of devices. Moreover, the base unit 104 may determine a value N between a predetermined minimum contention window size and the adjusted contention window size.

Figure 2:
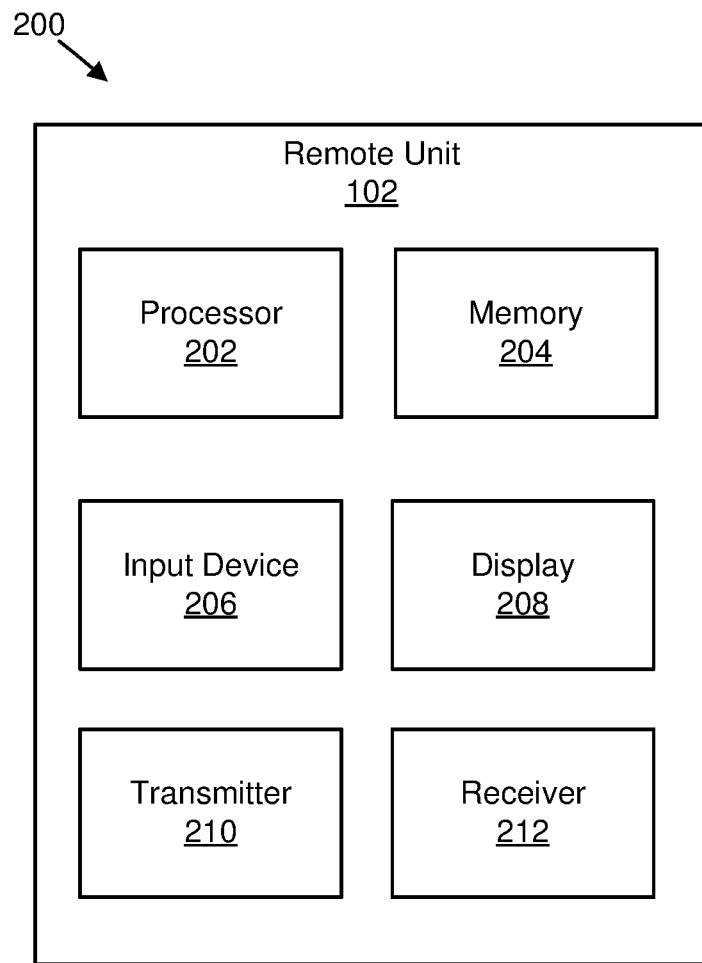
FIG. 2 is a schematic block diagram illustrating one embodiment of an apparatus that may be used for contention window size adjustment.

FIG. 2 depicts one embodiment of an apparatus 200 that may be used for contention window size adjustment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine an indication of whether interference above a certain level exists on the carrier during the transmission burst by comparing a received signal-to-interference-plus-noise ratio ("SINR") in a subframe in the transmission burst with a SINR that achieves a predetermined target block error ratio ("BLER") for an indicated modulation and coding scheme for the data transmitted in the subframe.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit feedback information and/or an indication to the base unit 104. In certain embodiments, the receiver 212 may be used to receive data on a carrier in a transmission burst with a duration of at least one subframe. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
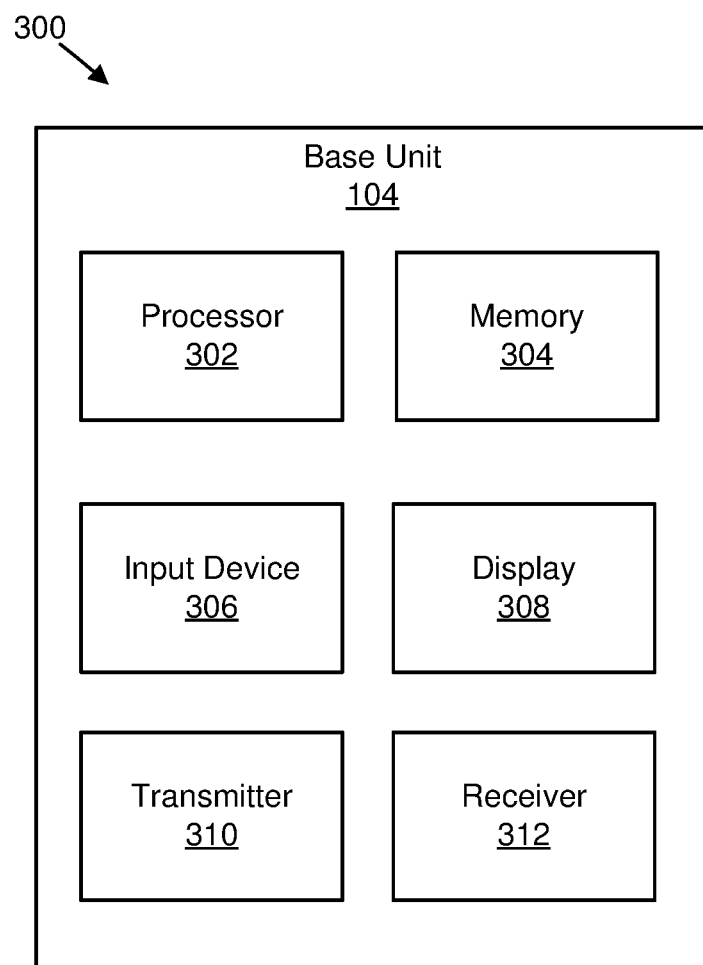
FIG. 3 is a schematic block diagram illustrating another embodiment of an apparatus that may be used for contention window size adjustment.

FIG. 3 depicts another embodiment of an apparatus 300 that may be used for contention window size adjustment. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine, based on feedback information, whether interference above a predetermined level exists on a carrier during a transmission burst transmitted to one or more remote units 102. In one embodiment, the base unit 104 identifies the presence of interference above a predetermined level for a particular remote unit 102 by examining the HARQ-ACK feedback from the remote unit 102.

For example, assume that a remote unit 102 is scheduled with DL transmission in M subframes in a latest transmission burst (e.g., the most recent transmission burst that the remote unit 102 received from the base unit 104) and provides M HARQ-ACK feedback corresponding to the PDSCH in the M scheduled subframes. In certain embodiments, the base unit 104 identifies the presence of interference above a predetermined level for the remote unit 102 if the percentage of NAKs in the M HARQ-ACK feedback from the remote unit 102 is above a certain predetermined threshold Y, and identifies that there are no such interference for the remote unit 102 otherwise. In one embodiment, the value of the predetermined threshold Y is fixed in a specification, while in another embodiment, the value of the predetermined threshold Y is selected by the base unit 104.

In yet another embodiment, the base unit 104 identifies the presence of interference above a predetermined level for the remote unit 102 if the remote unit 102 feeds back NAK for more than Z consecutive scheduled subframes, and identifies that there is no such interference for the remote unit 102 otherwise. In one embodiment, the value of the threshold Z is fixed in a specification, while in another embodiment, the value of the threshold Z is selected by the base unit 104.

In another embodiment, the base unit 104 identifies the presence of interference above a predetermined level for a remote unit 102 by receiving an explicit indication from the remote unit 102. In one embodiment, the remote unit 102 sets the explicit indication of the presence of such interference by comparing the received SINR in a scheduled subframe with the SINR used to achieve a certain target BLER for the indicated modulation and coding scheme ("MCS"). The MCS for the PDSCH is indicated by the DL grant used for scheduling the PDSCH transmission for a remote unit 102. In some embodiments, base unit 104 selects a MCS to achieve a certain target BLER (e.g. 10% BLER). In one embodiment, for the indicated MCS, if the received SINR calculated by the remote unit 102 in the scheduled subframe results in a BLER higher than the target BLER by a margin T percent, the remote unit 102 may determine the presence of interference above a predetermined level and then sets the explicit indication accordingly. In one embodiment, the value of T is fixed in a specification. In another embodiment, the value of T is chosen by the base unit 104.

In another embodiment, if the MCS to meet the target BLER with the received SINR in the scheduled subframe is S levels lower than the indicated MCS in the DL grant, the remote unit 102 may determine the presence of interference above a predetermined level and then sets the explicit indication accordingly. In one embodiment, the value of S is fixed in a specification. In another embodiment, the value of S is chosen by the base unit 104 and indicated to the remote unit 102 by high layer signaling. In another embodiment, the value of S is chosen by the remote unit 102.

In another embodiment, for a remote unit 102 scheduled with M subframes in the latest transmission burst, if the received SINRs calculated by the remote unit 102 in each of a percentage Q of the M scheduled subframes results in a BLER higher than the target BLER by a margin T percent, the remote unit 102 may determine the presence of interference above a predetermined level and then sets the explicit indication accordingly. In yet another embodiment, for a remote unit 102 scheduled with M subframes in the latest transmission burst, if the MCS to meet the target BLER with the SINR in each of a percentage Q of the M scheduled subframes is S levels lower than the indicated MCS in the respective DL grant, the remote unit 102 may determine the presence of interference above a predetermined level and then sets the explicit indication accordingly. In one embodiment, the value of Q is fixed in a specification.

In another embodiment, the value of Q is chosen by the base unit 104 and indicated to the remote unit 102 by high layer signaling. In another embodiment, the value of S is chosen by the remote unit 102.

In yet another embodiment, the base unit 104 may identify the presence of interference above a predetermined level for a remote unit 102 by examining the CSI feedback from the remote unit 102. The base unit 104 may trigger aperiodic CSI feedback for the remote units 102 scheduled in the latest transmission burst. In one embodiment, if the CQI feedback corresponding to the latest transmission burst from a remote unit 102 is lower than P levels from the previous CQI feedback from the same remote unit 102, the base unit 104 may identify the presence of interference above a predetermined level for the remote unit 102; otherwise, the base unit 104 may indicate that there is no such interference identified for the remote unit 102. In one embodiment, the value of P is fixed by a specification. In another embodiment, the value of P is chosen by the base unit 104.

In some embodiments, the processor 302 may be used to adjust a contention window size based on the determination of whether interference above the predetermined level exists on a carrier during a transmission burst provided to one or more remote units 102 (e.g., collectively or individually). In one embodiment, the base unit 104 increases the contention window size if the presence of interference above a predetermined level (e.g., a hidden node problem) is identified for more than a certain percentage (e.g., X) of remote units 102, and decreases the contention window size otherwise. In one embodiment, the set of remote units 102 are the set of remote units 102 that are scheduled with DL transmission in the latest transmission burst from the base unit 104. In one embodiment, the value of percentage X is fixed in a specification. In another embodiment, the value of percentage X is chosen by the base unit 104. In one embodiment, the base unit 104 sets the value of percentage of X based on an assessment on how busy the unlicensed carrier is.

In one embodiment, all the scheduled remote units 102 are divided into two sets, Set 1 and Set 2. Set 1 includes the remote units 102 in which the presence of interference above a predetermined level has been identified and Set 2 includes the remote units 102 in which the presence of interference above a predetermined level has not been identified. The two sets may need to be updated after the completion of each transmission burst. In another embodiment, the base unit 104 increases the contention window size if it intends to schedule one or more remote units 102 in Set 1, in the next transmission burst. In one embodiment, the one or more UEs are scheduled with DL transmission in the latest transmission burst from the base unit 104.

In yet another embodiment, the base unit 104 decreases the contention window size if it does not intend to schedule one or more remote units 102 in Set 1 in the next transmission burst. In one embodiment, the one or more remote units 102 are scheduled with DL transmission in the latest transmission burst from the base unit 104. In one embodiment, increasing the contention window size means doubling the contention window size till the maximum value of possible contention window size. In one embodiment, decreasing the contention window size means setting the contention window size to the minimum value of possible contention window size. In certain embodiments, the processor 302 may determine a value N between a predetermined minimum contention window size and an adjusted contention window size. In such embodiments, the value N may be used to delay a transmission burst.

The transmitter 310 is used to provide DL communication signals to the remote unit 102 and the receiver 312 is used to receive UL communication signals from the remote unit 102. In certain embodiments, the transmitter 310 is used to transmit data on a carrier to one or more remote units 102 in a first transmission burst having a duration of at least one subframe. In one embodiment, the receiver 312 is used to receive feedback information from the one or more remote units 102. In various embodiments, the transmitter 310 is used to transmit a second transmission burst on the carrier at least N time slots after the end of the first transmission burst. In such embodiments, the duration of each time slot may be predetermined. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
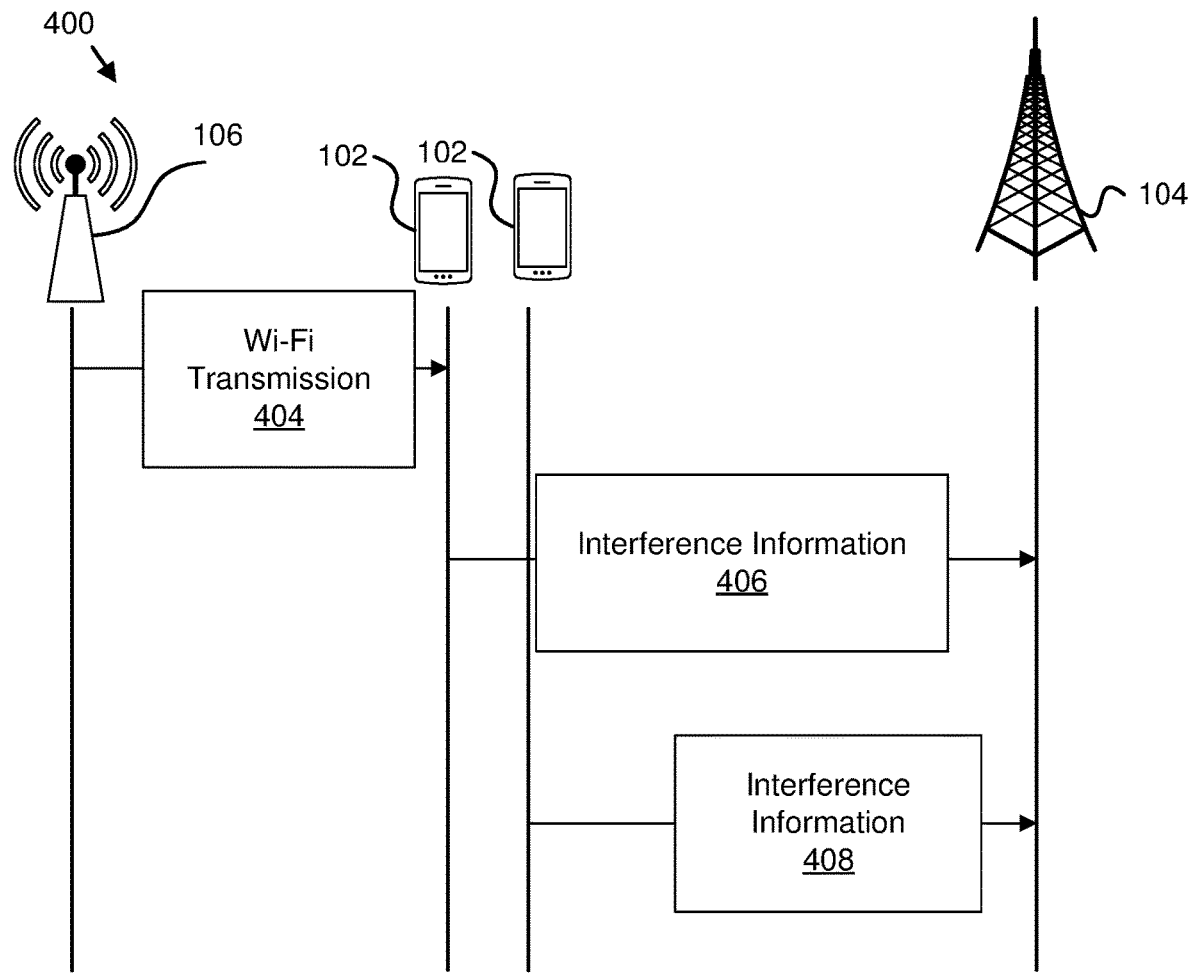
FIG. 4 illustrates one embodiment of communication used for contention window size adjustment.

FIG. 4 illustrates one embodiment of communication 400 used for contention window size adjustment. In the illustrated embodiment, a first remote unit 102 suffers the interference from Wi-Fi transmissions 404 on an unlicensed carrier 106. However, a second remote unit 102 does not suffer the interference from the Wi-Fi transmissions 404 on the unlicensed carrier 106. Accordingly, the first remote unit 102 provides interference information 406 to a base unit 104. The interference information 406 includes information that facilitates the base unit 104 determining that there is a hidden node within range of the first remote unit 102. For example, the interference information 406 may include information about whether the presence of interference above a predetermined level is identified. The interference information 406 may be any suitable information, such as HARQ-ACK feedback, CQI feedback, an actual indication of whether the first remote unit 102 detects the hidden node, and so forth.

Moreover, the second remote unit 102 provides interference information 408 to the base unit 104. As may be appreciated, the interference information 408 may include information about whether the presence of interference above a predetermined level is identified. In the illustrated embodiment, the second remote unit 102 is not aware of the presence of such interference, therefore, the interference information 408 indicates that the second remote unit 102 has not detected such interference. The base unit 104 uses the information from the remote units 102 to determine whether there is interference above a predetermined level, and if interference is above a predetermined level, the base unit 104 may adjust a contention window size for the remote units 102.

Figure 5:
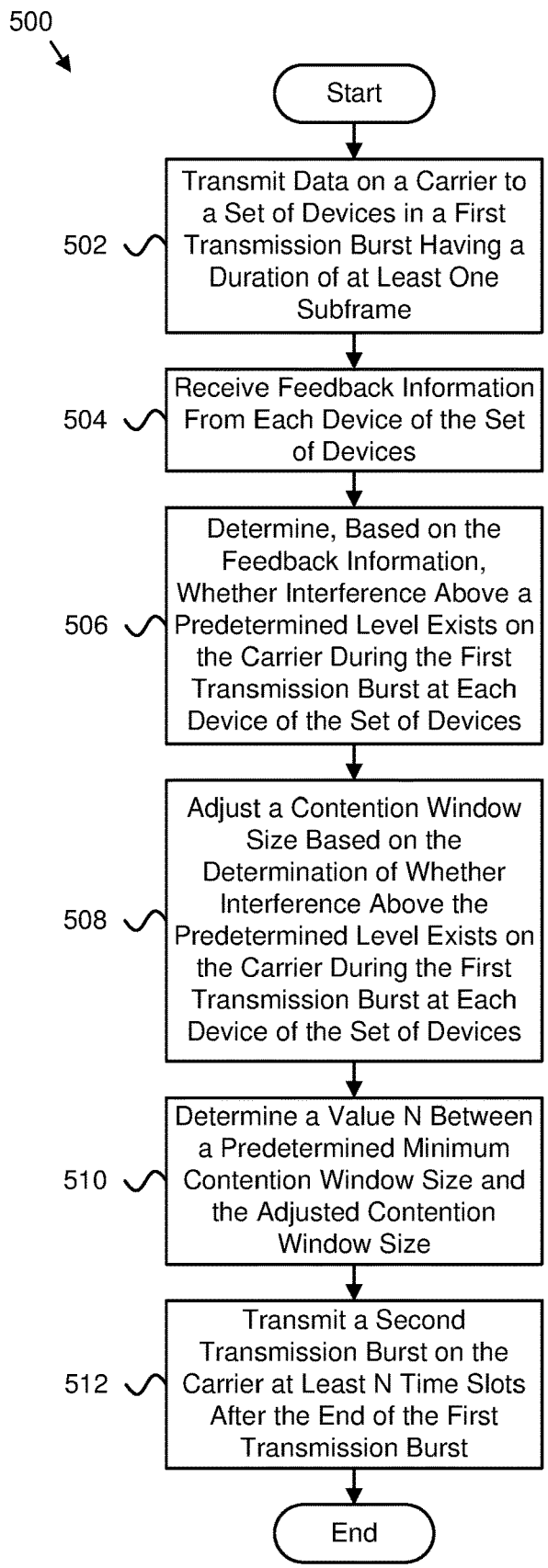
FIG. 5 is a schematic flow chart diagram illustrating one embodiment of a method for contention window size adjustment.

FIG. 5 is a schematic flow chart diagram illustrating one embodiment of a method 500 for contention window size adjustment. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 data on a carrier to a set of devices in a first transmission burst having a duration of at least one subframe. In certain embodiments, the set of devices includes one or more devices (e.g., remote units 102). In some embodiments, the base unit 104 may transmit 502 the data on the carrier to the set of devices in the first transmission burst having the duration of at least one subframe.

The method 500 may include receiving 504 feedback information from each device of the set of devices. In certain embodiments, the base unit 104 may receive 504 the feedback information from each device of the set of devices. In some embodiments, the set of devices is scheduled for DL transmission by the first transmission burst.

The method 500 may also include determining 506, based on the feedback information, whether interference above a predetermined level exists on the carrier during the first transmission burst at each device of the set of devices. In certain embodiments, the base unit 104 may determine 506, based on the feedback information, whether interference above the predetermined level exists on the carrier during the first transmission burst at each device of the set of devices.

In one embodiment, the feedback information from each device of the set of devices includes HARQ-ACK feedback corresponding to the data transmitted in the first transmission burst to the device. In such an embodiment, determining 506, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if a percentage of NAKs in the HARQ-ACK feedback from the device is greater than a predetermined threshold percentage. The predetermined threshold percentage may be any suitable percentage and may be hard coded, determined by a specification, or otherwise determined. In certain embodiments, the predetermined threshold percentage may be 10%, 15%, 30%, 50%, 75%, 90%, or any other percentage.

In certain embodiments, determining 506, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if more than a predetermined number of consecutive NAKs exist in the HARQ-ACK feedback from the device. The predetermined number of consecutive NAKs may be any suitable number and may be hard coded, determined by a specification, or otherwise determined. In certain embodiments, the predetermined number may be 3, 4, 5, 6, or any other suitable number.

In various embodiments, the feedback information from each device of the set of the devices includes an indication of whether there is a hidden node corresponding to the remote unit. For example, the indication may definitively indicate that either there is a hidden node, or that there is not a hidden node detected by the remote unit. In some embodiments, the feedback information from each device of the set of devices includes channel quality information ("CQI") feedback from the device corresponding to the CQI of the device in the first transmission burst. In such embodiments, determining 506, based on the feedback information, whether interference above the predetermined level exists on the carrier during the first transmission burst at each device of the set of devices includes determining, based on the feedback information, that interference above the predetermined level exists on the carrier during the first transmission burst for a device of the set of devices if the CQI feedback from the device is less than a latest CQI feedback from the device before the first transmission burst by a predetermined amount. As may be appreciated, the predetermined amount may be any suitable number.

The method 500 may include adjusting 508 a contention window size based on the determination of whether interference above the predetermined level exists on the carrier during the first transmission burst at each device of the set of devices. In some embodiments, the base unit 104 may adjust 508 the contention window size based on the determination of whether interference above the predetermined level exists on the carrier during the first transmission burst at each device of the set of devices.

In one embodiment, adjusting 508 the contention window size includes increasing the contention window size if interference above the predetermined level exists on the carrier during the first transmission burst for more than a predetermined percentage of devices in the set of devices. As may be appreciated, the predetermined percentage may be any suitable percentage. Moreover, in certain embodiments, adjusting 508 the contention window size includes decreasing the contention window size if interference above the predetermined level exists on the carrier during the first transmission burst for less than a predetermined percentage of devices in the set of devices. Again, the predetermined percentage may be any suitable percentage.

In some embodiments, adjusting 508 the contention window size includes increasing the contention window size if data is to be transmitted in the second transmission burst to at least one device having interference above the predetermined level on the carrier during the first transmission burst. In various embodiments, adjusting 508 the contention window size includes decreasing the contention window size if data is not to be transmitted in the second transmission burst to any device having interference above the predetermined level on the carrier during the first transmission burst.

The method 500 may include determining 510 a value N between a predetermined minimum contention window size and the adjusted contention window size. In various embodiments, the base unit 104 may determine 510 the value N between the predetermined minimum contention window size and the adjusted contention window size. As may be appreciated, the predetermined minimum contention window size may be any suitable value, such as 1, 2, 3, and so forth. In some embodiments, the method 500 may include transmitting 512 a second transmission burst on the carrier at least N time slots after the end of the first transmission burst. Then the method 500 may end. In certain embodiments, the duration of each time slot may be predetermined. In various embodiments, the base unit 104 may transmit 512 the second transmission burst on the carrier at least N time slots after the end of the first transmission burst.

Figure 6:
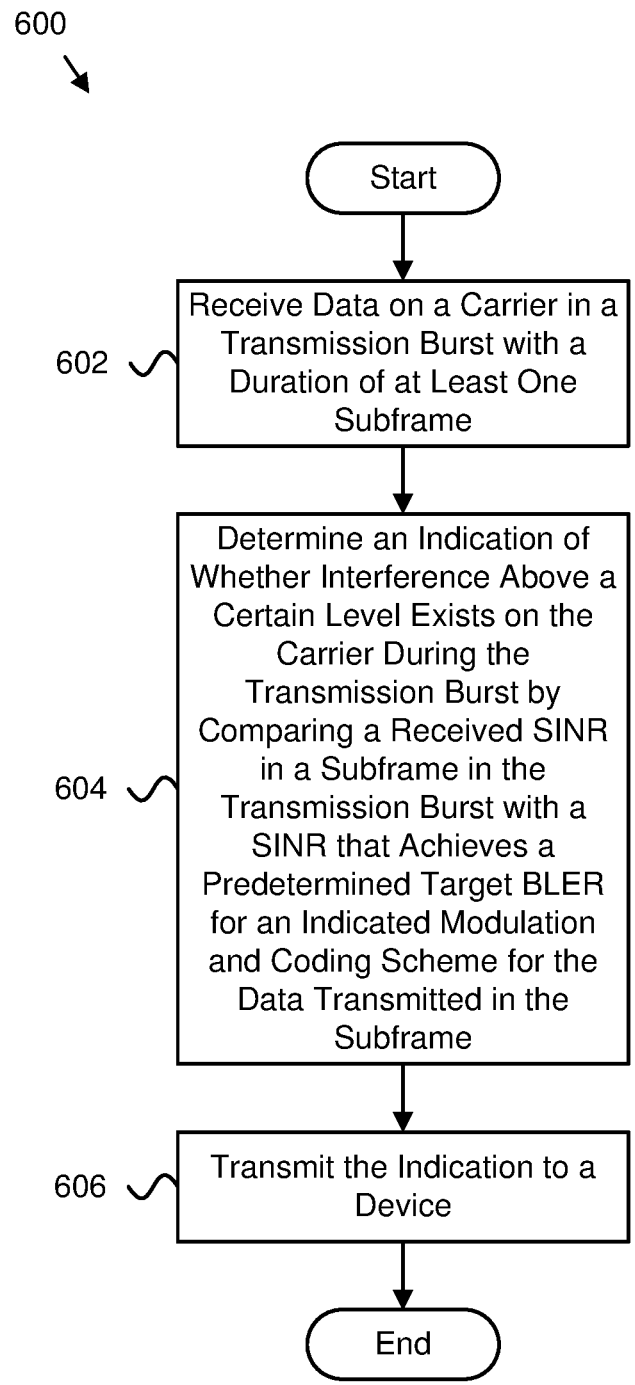
FIG. 6 is a schematic flow chart diagram illustrating another embodiment of a method for contention window size adjustment.
Figure 7:
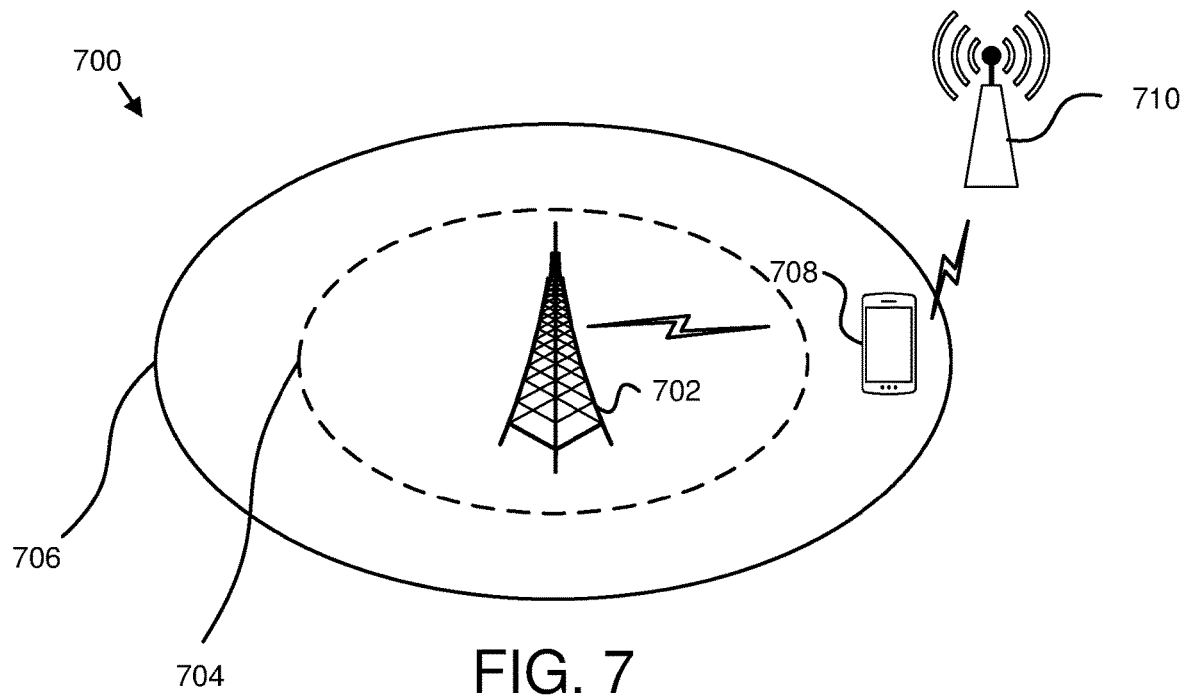
FIG. 7 is a schematic block diagram illustrating one embodiment of a wireless communication system that may use contention window size adjustment.
Figure 8:
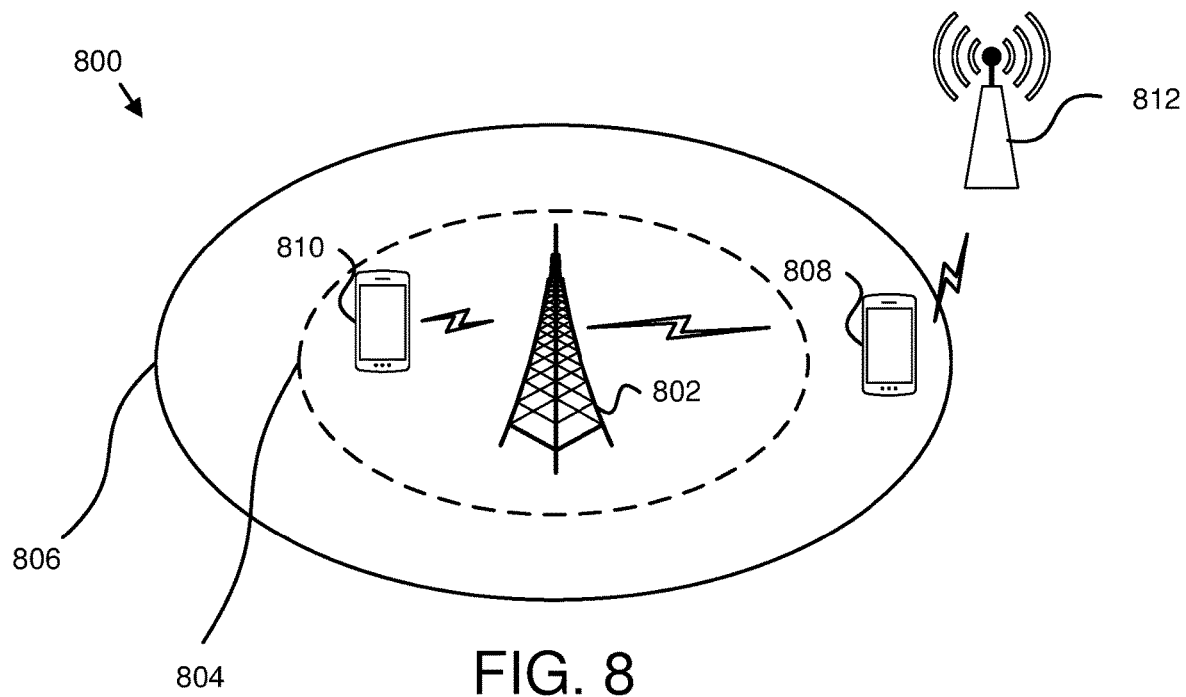
FIG. 8 is a schematic block diagram illustrating another embodiment of a wireless communication system that may use contention window size adjustment.

FIG. 6 is a schematic flow chart diagram illustrating another embodiment of a method 600 for contention window size adjustment. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 data on a carrier in a transmission burst with a duration of at least one subframe. In certain embodiments, a remote unit 102 may receive 602 the data on the carrier in the transmission burst with the duration of at least one subframe. The method 600 may also include determining 604 an indication of whether interference above a predetermined level exists on the carrier during the transmission burst by comparing a received SINR in a subframe in the transmission burst with a SINR that achieves a predetermined target BLER for an indicated modulation and coding scheme for the data transmitted in the subframe. In one embodiment, the remote unit 102 may determine 604 the indication of whether interference above the predetermined level exists on the carrier during the transmission burst by comparing the received SINR in the subframe in the transmission burst with the SINR that achieves the predetermined target BLER for the indicated modulation and coding scheme for the data transmitted in the subframe.

The method 600 may include transmitting 606 the indication to a device (e.g., a base unit 104). Then the method 600 may end. In certain embodiments, the transmitter 210 of the remote unit 102 may transmit 606 the indication to the device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a base station, the apparatus further comprising:
a transmitter that transmits data on a channel to a set of devices, wherein the set of devices comprises one or more devices;
a receiver that receives feedback information from the set of devices, wherein the feedback information comprises hybrid automatic repeat request feedback; and
a processor that increases a contention window size in response to the feedback information from the set of devices indicating a negative acknowledgement from a percentage of devices of the set of devices greater than a predetermined threshold.

2. The apparatus of claim 1, wherein the channel comprises a physical downlink shared channel.

3. The apparatus of claim 1, wherein the data is transmitted in a single subframe.

4. The apparatus of claim 1, wherein the processor senses that the channel is idle for a predetermined period of time prior to transmitting the data.

5. The apparatus of claim 4, wherein the predetermined period of time is based on a number N of time segments.

6. The apparatus of claim 1, wherein the negative acknowledgement from the percentage of devices of the set of devices greater than the predetermined threshold indicates that interference on the channel is too high.

7. The apparatus of claim 1, wherein the predetermined threshold is fixed in a specification.

8. The apparatus of claim 1, wherein the processor does not increase the contention window size in response to the feedback information from the set of devices indicating the negative acknowledgement from the percentage of devices of the set of devices less than the predetermined threshold.

9. A method of a base station, the method comprising:
transmitting data on a channel to a set of devices, wherein the set of devices comprises one or more devices;
receiving feedback information from the set of devices, wherein the feedback information comprises hybrid automatic repeat request feedback; and
increasing a contention window size in response to the feedback information from the set of devices indicating a negative acknowledgement from a percentage of devices of the set of devices greater than a predetermined threshold.

10. The method of claim 9, wherein the channel comprises a physical downlink shared channel.

11. The method of claim 9, wherein the data is transmitted in a single subframe.

12. The method of claim 9, further comprising sensing that the channel is idle for a predetermined period of time prior to transmitting the data.

13. The method of claim 12, wherein the predetermined period of time is based on a number N of time segments.

14. The method of claim 9, wherein the negative acknowledgement from the percentage of devices of the set of devices greater than the predetermined threshold indicates that interference on the channel is too high.

15. The method of claim 9, wherein the predetermined threshold is fixed in a specification.

16. The method of claim 9, wherein the contention window size is not increased in response to the feedback information from the set of devices indicating the negative acknowledgement from the percentage of devices of the set of devices less than the predetermined threshold.

17. An apparatus comprising a user equipment, the apparatus further comprising:
- a receiver that receives data on a channel, wherein the data is transmitted to a set of devices, and the set of devices comprises one or more devices;
- a transmitter that transmits feedback information to a base station, wherein the feedback information comprises hybrid automatic repeat request feedback, and a contention window size is increased in response to collective feedback information from the set of devices indicating a negative acknowledgement from a percentage of devices of the set of devices greater than a predetermined threshold.

18. The apparatus of claim 17, wherein the channel comprises a physical downlink shared channel.

19. The apparatus of claim 17, wherein the data is transmitted in a single subframe.

20. The apparatus of claim 17, wherein the predetermined threshold is fixed in a specification.

* * * * *